(12) United States Patent
Moreno et al.

(10) Patent No.: US 7,252,282 B2
(45) Date of Patent: Aug. 7, 2007

(54) ARMATURE WITH VENT PASSAGES FOR VEHICLE ACTUATOR

(75) Inventors: Alejandro Moreno, El Paso, TX (US); Santos Burrola, Juarez (MX)

(73) Assignee: Delphi Technologies, Inc., Troy, MI (US)

( * ) Notice: Subject to any disclaimer, the term of this patent is extended or adjusted under 35 U.S.C. 154(b) by 243 days.

(21) Appl. No.: 11/057,948

(22) Filed: Feb. 15, 2005

(65) Prior Publication Data

US 2006/0180782 A1   Aug. 17, 2006

(51) Int. Cl.
*F16K 31/02* (2006.01)

(52) U.S. Cl. .............................. 251/129.14; 251/129.15

(58) Field of Classification Search ........... 251/129.14, 251/129.15, 129.21
See application file for complete search history.

(56) References Cited

U.S. PATENT DOCUMENTS

| | | | |
|---|---|---|---|
| 3,550,632 A | * | 12/1970 | Kozel et al. ........... 251/129.21 |
| 3,757,263 A | * | 9/1973 | Saarem et al. ......... 251/129.15 |
| 4,087,773 A | * | 5/1978 | Jencks et al. .......... 251/129.15 |
| 4,326,696 A | * | 4/1982 | Ishikawa et al. ....... 251/129.21 |
| 4,859,005 A | * | 8/1989 | Rey et al. .............. 251/129.21 |
| 4,995,559 A | * | 2/1991 | Okamoto et al. ...... 251/129.22 |
| 4,998,559 A | * | 3/1991 | McAuliffe, Jr. ........ 251/129.21 |
| 5,255,855 A | * | 10/1993 | Maier et al. ........... 251/129.15 |
| 6,086,042 A | * | 7/2000 | Scott et al. ............ 251/129.15 |

* cited by examiner

*Primary Examiner*—John Bastianelli
(74) *Attorney, Agent, or Firm*—Paul L. Marshall

(57) ABSTRACT

In a vehicle solenoid valve, the spool that holds the actuation coil is formed with a hexagonal or octagonal inner chamber in which a cylindrical armature can slide. Owing to the different cross-sectional shapes between the spool and armature, a longitudinal fluid vent passageway is established along each edge of the chamber between the non-cylindrical walls of the chamber and the cylindrical armature so that movement of hydraulic fluid relative to the armature is promoted when the armature moves. The face of the spool that is oriented toward the valve end can be formed with radial vent grooves to further facilitate fluid venting when the armature moves.

4 Claims, 3 Drawing Sheets

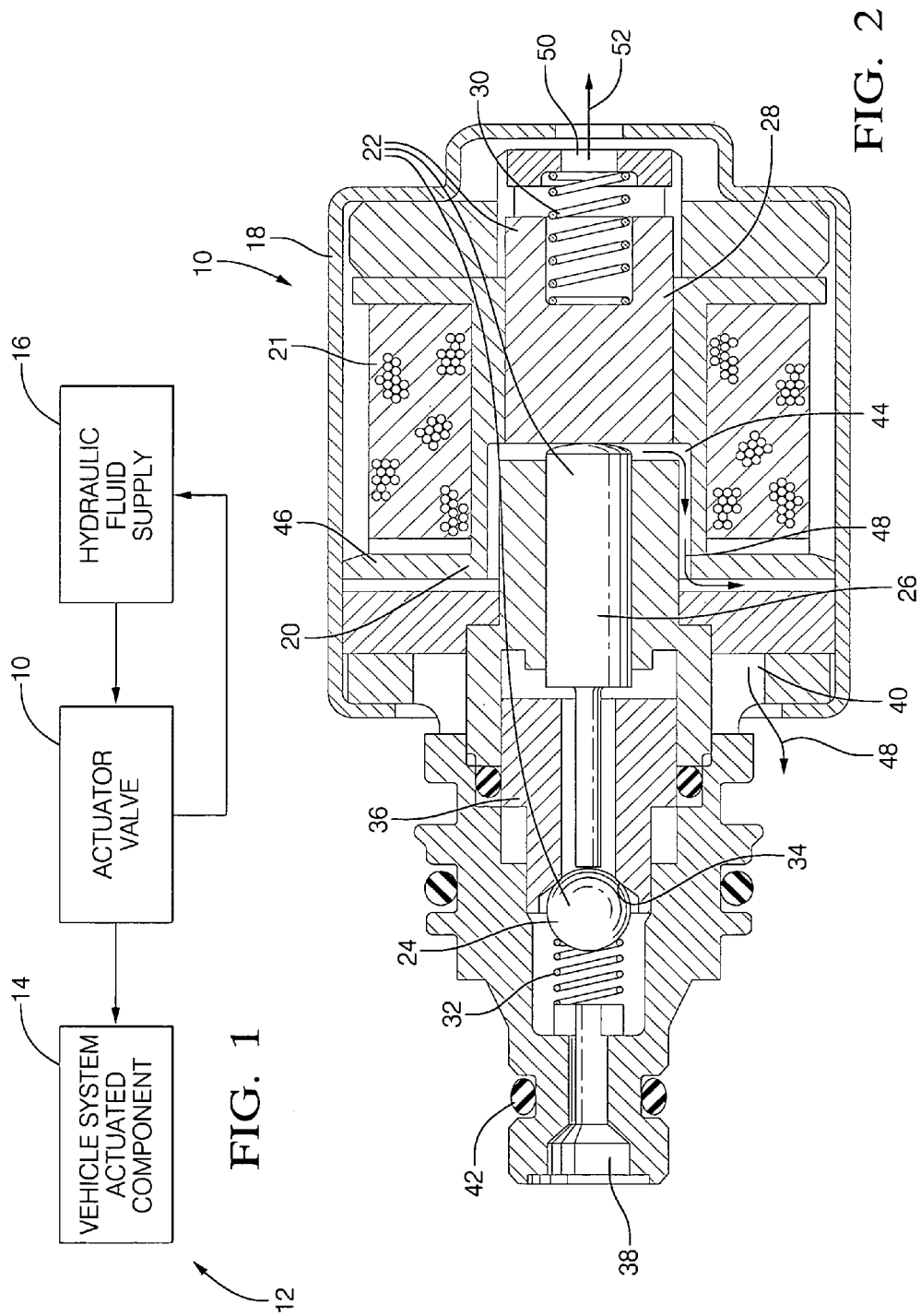

ARMATURE WITH VENT PASSAGES FOR VEHICLE ACTUATOR

FIELD OF THE INVENTION

The present invention relates to hydraulic actuators, and more particularly to vehicle actuators.

BACKGROUND OF THE INVENTION

Modern motor vehicles are equipped with numerous vehicle subsystems that are designed to increase the comfort and safety of drivers and passengers. For example, a vehicle can include an anti-lock braking system, a traction control system, a speed control system, and/or a vehicle stability enhancement control system. In turn, each subsystem can include numerous electrically-operated hydraulic actuators that use electric coils to move plungers and thereby direct hydraulic fluid to and from vehicle components such as a brake.

As recognized herein, the movement of a plunger in a hydraulic electro-mechanical valve can be retarded by the presence of hydraulic fluid in and around the plunger's passage, which represents a damping effect on plunger movement. This problem is of particular concern in systems that require very quick plunger movement. To address the problem, the plunger can be shaped to promote the relative motion of the fluid past the plunger.

As recognized herein, however, this approach not only can lead to performance degradation, but can require relatively costly manufacturing techniques. For instance, shaping the plunger typically requires removing plunger material, entailing costly machining, and the removal of plunger material undesirably reduces the electromagnetic coupling between the plunger and the activating electrical coil. The present invention has recognized these drawbacks, and has provided the below-disclosed solutions to one or more of them.

SUMMARY OF THE INVENTION

A valve includes a plastic spool defining, in one embodiment, a non-cylindrical inner chamber, and an actuation coil wound around the spool. By "non-cylindrical" is meant that the chamber has at least one flat wall extending longitudinally through the chamber, e.g., the chamber can be hexagonal shaped, in which case it has six flat walls. A cylindrical armature is at least partially disposed in the chamber of the spool for reciprocal motion therein. Since the chamber is not cylindrical but the armature is, the long edges of one or more flat walls of the chamber define longitudinal fluid vent passageways for promoting relative movement between fluid in the chamber and the armature when the armature moves.

The chamber may define plural flat sides establishing longitudinal junctions between adjacent sides, and in some implementations a respective longitudinal channel can be cut into each junction. The chamber can be, e.g., octagonal or hexagonal.

In an alternative embodiment, the chamber is cylindrical, and plural longitudinal channels are formed in the cylindrical wall. Unlike valves in which a small annular space may exist between a cylindrical armature and a cylindrical spool, in this embodiment a longitudinal channel is not annular. The channels may be evenly spaced from each other around the periphery of the chamber.

In some implementations the spool is formed with a transverse flange which faces a valve seat in the valve. This flange can be formed with plural fluid vent grooves. The grooves can be oriented radially with respect to the flange, and if desired a respective radial groove can be formed in the flange substantially contiguously to a respective longitudinal vent passageway in the chamber.

In another aspect, an electromechanical valve for a vehicle includes a valve body defining at least one hydraulic fluid passageway and an armature slidably engaged with the valve body for blocking and unblocking the passageway. A spool surrounds at least part of the armature and supports a wire coil. The spool is formed with a longitudinal fluid venting passageway and/or a radial fluid groove to facilitate movement of fluid as the fluid flows against the armature.

In still another aspect, an electromechanical valve for a vehicle hydraulic system includes a valve body that defines at least one hydraulic fluid pathway. Means are provided for blocking and unblocking the hydraulic fluid pathway. Also, means actuate the means for blocking using at least in part electrical current, with means being provided for supporting the actuating means. Formed on the supporting means are means for venting fluid adjacent the blocking means.

The present invention will now be described, by way of example, with reference to the accompanying drawings, in which:

BRIEF DESCRIPTION OF THE DRAWINGS

FIG. 1 is a simplified block diagram of a vehicle hydraulic system;

FIG. 2 is a longitudinal cross-sectional view of the present actuator;

DESCRIPTION OF AN EMBODIMENT OF THE INVENTION

Figure 3:
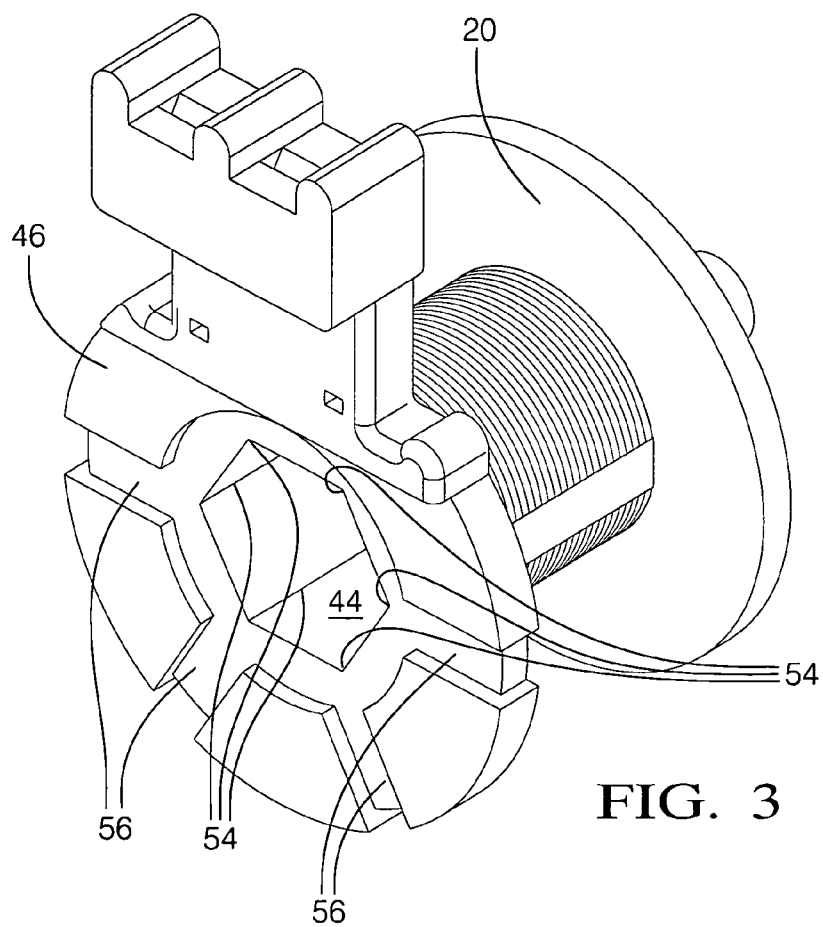
FIG. 3 is a perspective view of a hexagonal spool.

Referring initially to FIG. 1, an actuator valve 10 is shown in a vehicle, generally designated 12. The valve 10 can be part of the fluid communication path of a control system of the vehicle 12 for operating a component 14 of the control system. The valve 10 may communicate with a hydraulic fluid supply reservoir 16.

The control system may be any suitable control system requiring actuators such as but not limited transmission applications that use actuators to control the torque converter clutch (TCC) to smooth off-to-on position transitions, neutral-idle, and direct clutch gear shifting. The system may include various sensors and a processor in accordance with principles known in the art, with the processor selectively energizing and de-energizing the below-described coil of the actuator valve 10 based on signals from the sensors as appropriate to control fluid flow through the system.

It is to be understood that while FIG. 2 shows a two-way, normally closed valve with various valve body structures, other configurations may be provided wherein the valve might be normally open (e.g., because of the influence of fluid pressure) and may be closed upon energization of the coil 26. The present invention applies to three-way valves as well. Thus, the particular structure shown in FIG. 2 is for illustration only, and is not intended to limit the invention to any particular valving structure apart from what is defined in the claims.

As shown in FIG. 2, the actuator 10 includes a rigid, hollow, preferably ferrous metal coil can 18 in which a plastic molded spool 20 is disposed. An actuating coil 21 of wire is wound around the spool 20 as shown. At least a portion of a cylindrical armature 22, which may include several components as shown including a ball 24, cylindrical metal poppet 26 contacting the ball 24, and cylindrical metal plunger 28 contacting the poppet 26, is reciprocatingly disposed within the spool 20 for reciprocating motion along the long axis of the armature 18 when the coil 21 is energized and de-energized. An armature spring 30 can be provided to urge the armature 22 to the left in FIG. 2, while a ball spring 32 can be provided to urge the armature 22 to the right. The armature spring maintains the ball 24, poppet 26, and plunger 28 in contact with each other to facilitate good dynamic response.

As can be appreciated in reference to FIG. 2, the ball 24 can be moved against a complementarily-shaped valve seat 34 that is defined by a valve body 36. The valve body 36 may be made of two pieces. FIG. 2 shows the position of the illustrative non-limiting valve 10 when the coil 21 is de-energized. When the coil 21 is energized, the armature 22 moves left, against the force of the ball spring 32, to unseat the ball 24 and open a hydraulic fluid pathway between first and second ports 38, 40 that are formed by the valve body 36. Upon de-energization of the coil 21, the ball spring 32 seats the ball 24 to block the hydraulic fluid pathway. Other valve structure including, e.g., sealing o-rings 42 may be provided in accordance with principles known in the art. If desired, the valve may instead by designed to be normally open (i.e., open when de-energized) instead of normally closed as discussed above by, e.g., appropriately selecting the spring constants of the springs 30, 32.

In cross-reference to FIGS. 2 and 3, the spool 20, which can be made of a unitary piece of molded plastic, is formed with a non-cylindrical inner chamber 44 in which the armature 22 can move. As set forth further below, longitudinal vent passageways are established between the walls of the chamber 44 and the cylindrical armature contained therein. Also, the spool 20 can be formed with a transverse flange 46 that circumscribes the chamber 44 and that faces the valve seat 34, i.e., that faces the valve body. In addition to or alternatively to the vent passageways established by the non-cylindrical chamber 44, radial grooves can be formed in the spool 20. In any case, the present structure facilitates the movement of fluid relative to the armature 22 when the armature 22 moves, and more particularly the structure can promote the movement of fluid out of the second port 40 as indicated by the arrows 48 and/or out of a rear exhaust port 50 as indicated by the arrow 52. Flow can also be in the reverse direction to those shown by the arrows 48, 52.

With particular reference to FIG. 3, the inner chamber 44 of the spool 20 is non-round in transverse cross-section, e.g., it may be hexagonal in transverse cross-section, such that one or more longitudinal fluid vent passageways 54 are established from one open end of the spool 20 to the other end. In the embodiment shown in FIG. 3, the spool 20 internally has a hexagonal transverse cross-section, so that six vent passageways 54 are established, one along each junction of adjacent flat side walls of the hexagonal chamber 44 as shown. It is to be appreciated that when a cylindrical armature is disposed in the chamber 44, the vent passageways 54 permit fluid to channel along the length of the chamber 44.

In addition, the flange 46 may be formed with one or more radial fluid vent grooves 56, as shown in FIG. 3. Each groove 56 can extend from the chamber 44 to the outer edge of the flange 46 as shown, and if desired, each radial groove 56 may be contiguous with a respective longitudinal vent passageway 54. The grooves 56 promote fluid flow past the armature 22, in and out of the second port 40.

Figure 4:
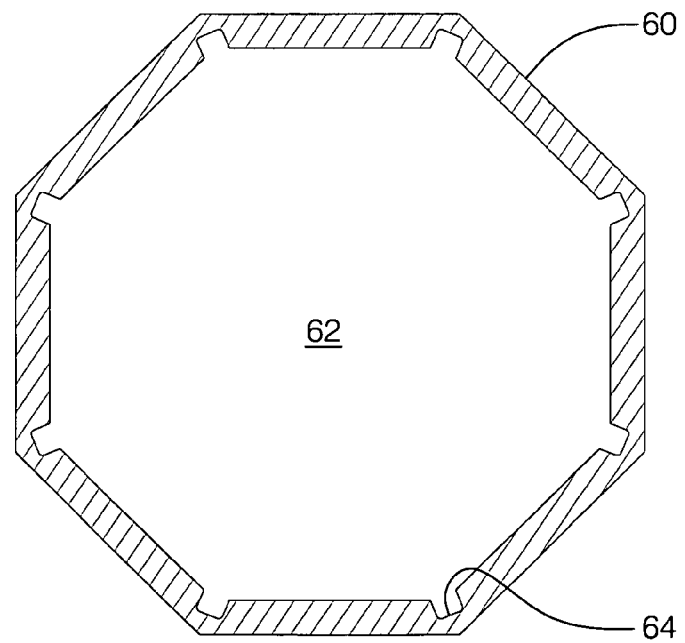
FIG. 4 is a transverse cross-sectional view of an octagonal spool.

FIG. 4 shows a spool 60 that has an octagonal inner chamber 62 in which the armature 22 disclosed above can move. The octagonal shape is another non-limiting example of a plastic spool chamber that is non-cylindrical. If desired, as shown in the non-limiting embodiment of FIG. 4 the vent passageways that are established by the edges or corners of the non-cylindrical chamber can be enlarged for even greater fluid flow by cutting a respective recess 64 into each chamber wall junction as shown that extends radially outward beyond the walls of the chamber.

Figure 5:
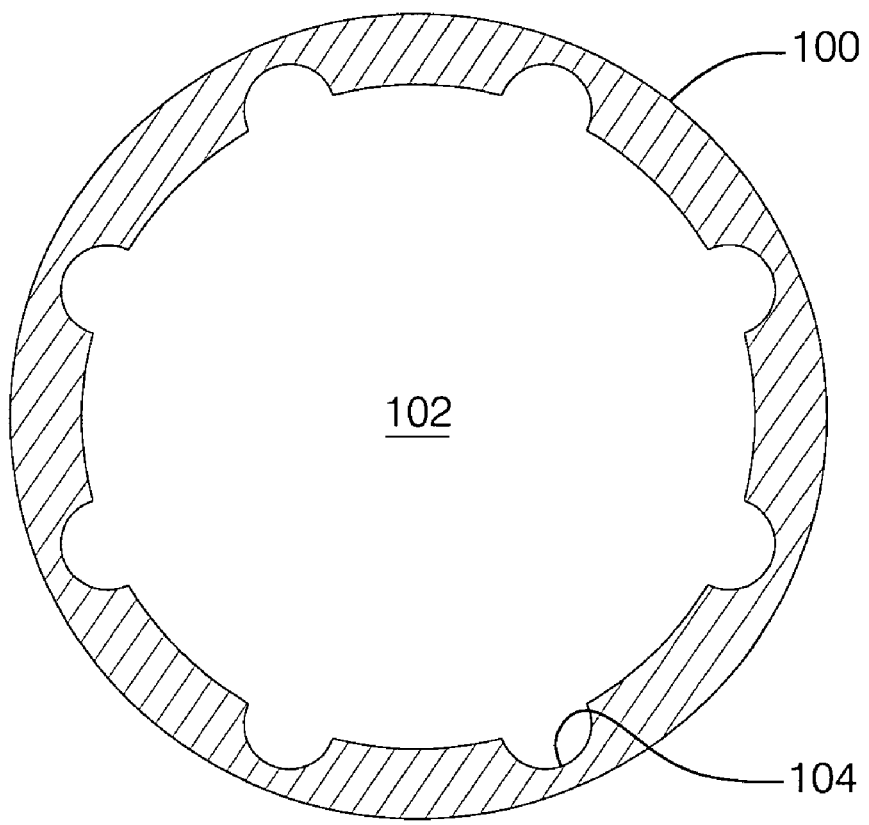
FIG. 5 is a transverse cross-sectional view of an alternative spool.

In an alternative embodiment shown in FIG. 5, a plastic spool 100 defines a cylindrical chamber 102, and plural longitudinal channels 104 are formed in the cylindrical wall of the chamber 102 as shown. In the embodiment of FIG. 5 a longitudinal channel 104 is not annular (indeed, as the fluid vent passageways discussed in the embodiments above are not annular), but rather is elongated in the longitudinal dimension as shown. The channels 104 may be evenly spaced from each other around the periphery of the chamber 102 as shown in FIG. 5. Each channel 104 extends radially beyond the cylinder formed by the wall of the chamber as shown.

While the particular ARMATURE WITH VENT PASSAGES FOR VEHICLE ACTUATOR as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A valve, comprising:
   a plastic spool defining a non-cylindrical inner chamber;
   an actuation coil wound around the spool; and
   an armature having at least a cylindrical portion at least partially disposed in the chamber of the spool for reciprocal motion therein, wherein
   at least one long edge of at least one flat wall of the chamber defines a longitudinal fluid vent passageway extending radially beyond the cylindrical portion of the armature for promoting relative movement between fluid in the chamber and the armature when the armature moves at least one valve seat, the spool being formed with a transverse flange facing the valve seat, the flange being formed with plural fluid vent grooves oriented radially with respect to the flange.

2. The valve of claim 1, wherein a respective radial groove is formed in the flange substantially contiguously to a respective longitudinal vent passageway in the chamber.

3. An electro-mechanical valve for a vehicle, comprising:
a valve body defining at least one hydraulic fluid pathway;
an armature slidably engaged with the valve body for blocking and unblocking the hydraulic fluid pathway; and
a spool surrounding at least part of the armature and supporting a wire coil, the spool being formed with at least one of: a longitudinally-oriented vent passageway that is not annular, and a radially-oriented fluid groove, to facilitate movement of fluid around the armature, wherein the spool defines a non-cylindrical inner chamber having plural longitudinal flat walls with a junction being defined between adjacent walls, each junction establishing a longitudinal vent passageway, and wherein the spool is formed with a transverse flange facing the hydraulic fluid passageway, the flange being formed with plural fluid vent grooves oriented radially with respect to the flange.

4. The valve of claim 3, wherein a respective groove is formed in the flange substantially contiguously to a respective vent passageway in the chamber.

* * * * *